(12) United States Patent
Ota

(10) Patent No.: US 8,988,794 B2
(45) Date of Patent: Mar. 24, 2015

(54) IMAGE PICKUP OPTICAL SYSTEM AND IMAGE PICKUP APPARATUS USING THE SAME

(71) Applicant: Olympus Corporation, Tokyo (JP)

(72) Inventor: Ryu Ota, Tokyo (JP)

(73) Assignee: Olympus Corporation, Tokyo (JP)

( * ) Notice: Subject to any disclaimer, the term of this patent is extended or adjusted under 35 U.S.C. 154(b) by 45 days.

(21) Appl. No.: 13/789,958

(22) Filed: Mar. 8, 2013

(65) Prior Publication Data

US 2013/0250440 A1    Sep. 26, 2013

(30) Foreign Application Priority Data

Mar. 21, 2012  (JP) .................................. 2012-063711

(51) Int. Cl.
*G02B 9/34*    (2006.01)
*G02B 13/18*   (2006.01)
*G02B 3/02*    (2006.01)
*G02B 13/00*   (2006.01)

(52) U.S. Cl.
CPC ................................ *G02B 13/004* (2013.01)
USPC ......................................... 359/773; 359/715

(58) Field of Classification Search
CPC .............................. G02B 13/004; G02B 13/18
USPC ................................................. 359/773, 715
See application file for complete search history.

(56) References Cited

U.S. PATENT DOCUMENTS

| | | | | |
|---|---|---|---|---|
| 7,403,344 B2 * | 7/2008 | Xu et al. | | 359/779 |
| 2010/0309367 A1 * | 12/2010 | Iba et al. | | 348/345 |
| 2012/0062782 A1 * | 3/2012 | Huang | | 348/340 |
| 2012/0327521 A1 * | 12/2012 | Tsai et al. | | 359/715 |
| 2013/0044379 A1 * | 2/2013 | Hsieh et al. | | 359/715 |

FOREIGN PATENT DOCUMENTS

| | | |
|---|---|---|
| JP | 2008-158413 A | 7/2008 |
| JP | 2008-268946 A | 11/2008 |

* cited by examiner

*Primary Examiner* — Alicia M Harrington
(74) *Attorney, Agent, or Firm* — Brosemer, Kolefas & Associates, LLC

(57) ABSTRACT

An image pickup optical system includes in order from an object side, a first lens having a positive refractive power, a second lens having a negative refractive power, a third lens having a positive refractive power, and a fourth lens having a negative refractive power. The first lens has a biconvex shape. An image-side surface of the second lens has a shape such that, a concave surface is directed toward an image side. At least an image-side surface of the third lens has a shape such that, a convex surface is directed toward the image side. An aperture is disposed nearest to the object side, and the following conditional expression (1) is satisfied:

$$0.9 < f_1/f \qquad (1),$$

where $f_1$ denotes a focal length of the first lens and f denotes a focal length of the overall image pickup optical system.

9 Claims, 13 Drawing Sheets

IMAGE PICKUP OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2012-063711 filed on Mar. 21, 2012; the entire contents of which are incorporated herein by reference.

BACKGROUND OF THE INVENTION

1. Field of the Invention

The present invention relates to an image pickup optical system and an image pickup apparatus using the same.

2. Description of the Related Art

In recent years, with slimming of a portable telephone and a portable terminal, or a notebook-size personal computer, a camera module in which, a length of an optical system in an optical axial direction is reduced to the utmost limit has been sought. In order to fulfill the need, a large number of single-focus optical systems which include two to three aspheric lenses have been proposed.

Moreover, in recent years, with the advancement of technology related to an image pickup element, and with increasing needs of the market, a low-cost camera module with a large number of pixels and a wide angle, while being small-size, has been sought. As an optical system in which, shortening of an overall length has been facilitated while improving an image forming performance, a single-focus optical system which includes four lenses has been proposed (Japanese Patent Application Laid-open Publication Nos. 2008-158413 and 2008-268946)

SUMMARY OF THE INVENTION

An image pickup optical system according to the present invention, includes in order from an object side, a first lens having a positive refractive power, a second lens having a negative refractive power, a third lens having a positive refractive power, and a fourth lens having a negative refractive power, and the first lens has a biconvex shape, and an image-side surface of the second lens has a shape such that, a concave surface is directed toward an image side, and at least an image-side surface of the third lens has a shape such that, a convex surface is directed toward the image side, and an aperture stop is disposed nearest to the object side, and the following conditional expression (1) is satisfied:

$$0.9 < f_1/f \quad (1)$$

where $f_1$ denotes a focal length of the first lens, and f denotes a focal length of the overall image pickup optical system.

An image pickup apparatus according to the present invention includes the abovementioned image pickup optical system, and an image pickup element.

BRIEF DESCRIPTION OF THE DRAWINGS

FIG. 13A is a front view of a portable telephone 400, FIG. 13B is a side view of the portable telephone 400, and FIG. 13C is a cross-sectional view of a photographic optical system 405.

DETAILED DESCRIPTION OF THE INVENTION

Figure 1:
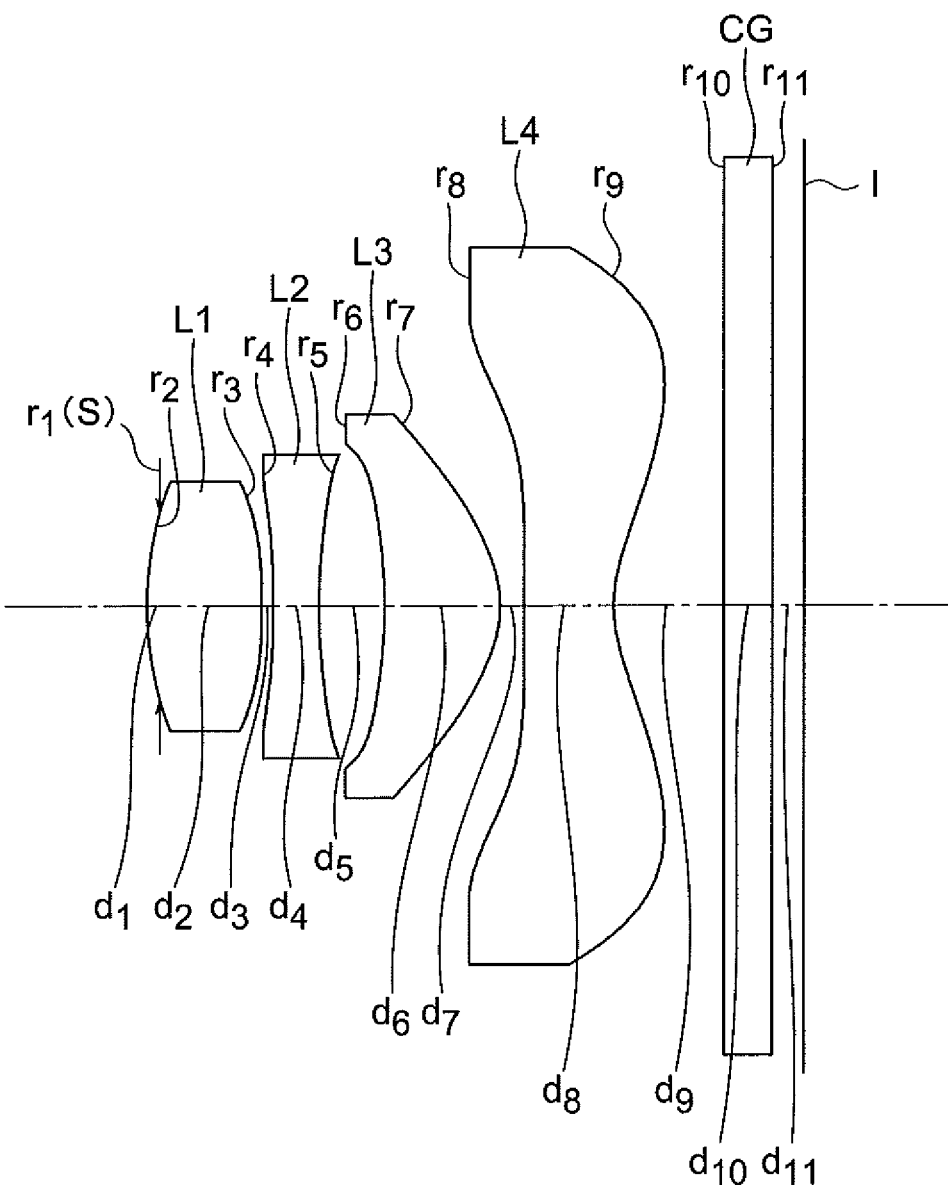
FIG. 1 is a cross-sectional view along an optical axis showing an optical arrangement at the time of infinite object point focusing of an image pickup optical system according to a first example of the present invention.
Figure 2:
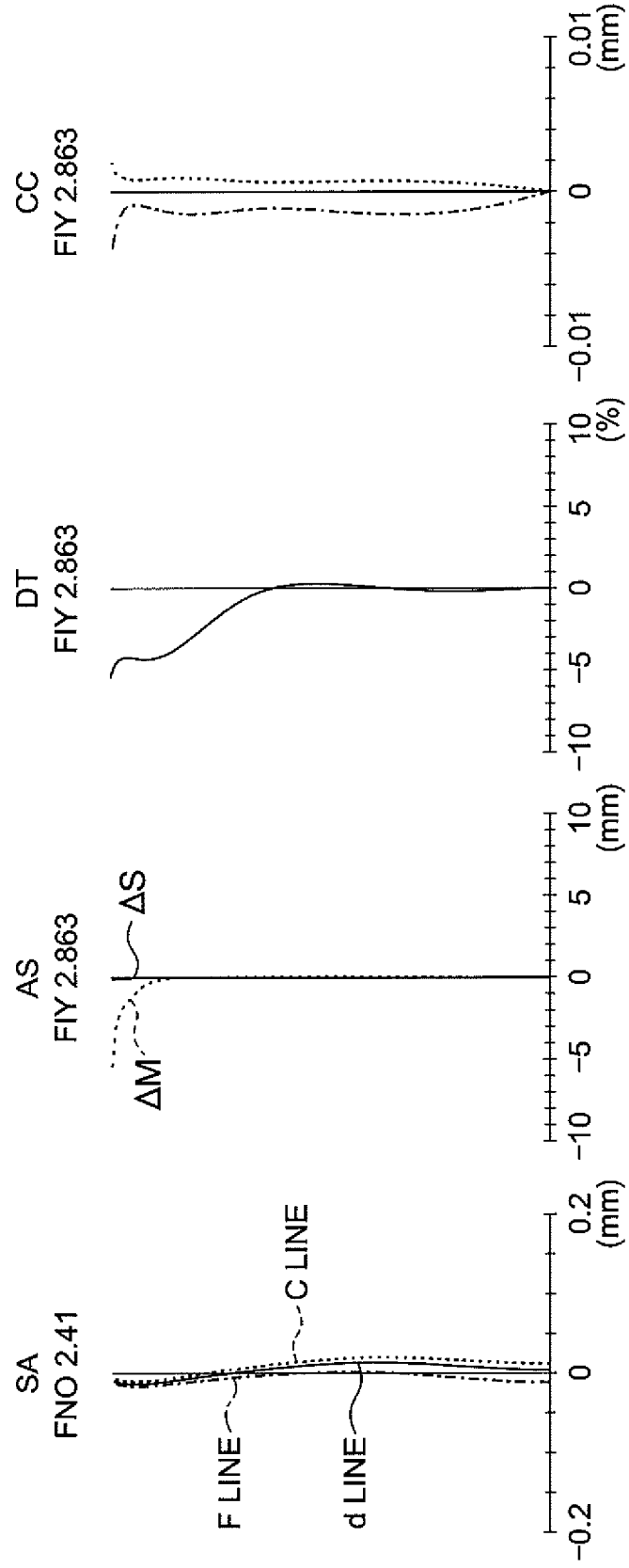
FIG. 2A, FIG. 2B, FIG. 2C, and FIG. 2D (hereinafter, 'FIG. 2A to FIG. 2D') are diagrams showing spherical aberration (SA), astigmatism (AS), distortion (DT), and chromatic aberration of magnification (CC) at the time of infinite object point focusing of the image pickup optical system according to the first example.

An image pickup optical system according to the present embodiment will be described below. The image pickup optical system according to the present embodiment includes in order from an object side, a first lens having a positive refractive power, a second lens having a negative refractive power, a third lens having a positive refractive power, and a fourth lens having a negative refractive power, and the first lens has a biconvex shape, and an image-side surface of the second lens has a shape such that, a concave surface is directed toward an image side, and at least an image-side surface of the third lens has a shape such that, a convex is surface directed toward the image side, and an aperture stop is disposed nearest to the object side, and the following conditional expression (1) is satisfied:

$$0.9 < f_1/f \quad (1)$$

where f₁ denotes a focal length of the first lens, and f denotes a focal length of the overall image pickup optical system.

In the image pickup optical system according to the present embodiment, a refractive-power arrangement in order from the object side is a positive refractive power, a negative refractive power, a positive refractive power, a negative refractive power. By adopting such refractive-power arrangement, it is possible to position a principal point of the image pickup optical system on the object side. As a result, since it becomes possible to shorten the overall length of the optical system sufficiently with respect to the focal length of the overall image pickup optical system, it is possible to realize shortening of the overall length of the optical system.

Moreover, in the image pickup optical system according to the present embodiment, the first lens has a biconvex shape, and the image-side surface of the second lens has a shape such that, the concave surface is directed toward the image side, and at least the image-side surface of the third lens has a shape such that, the convex surface is directed toward the image side.

Moreover, in the image pickup optical system according to the present embodiment, by disposing the aperture stop nearest to the object side, it is possible to keep an exit pupil away from an image plane. Accordingly, it is possible to make small an angle of an off-axis principal ray with respect to an optical axis. As a result, it is possible to shorten the overall length of the optical system and to avoid degradation of sensitivity of a peripheral portion of an image pickup element while bringing the optical system closer to a telecentric state.

Furthermore, in the image pickup optical system according to the present embodiment, the following conditional expression (1) is satisfied.

$$0.9 < f_1/f \quad (1)$$

where f₁ denotes a focal length of the first lens, and f denotes a focal length of the overall image pickup optical system.

Conditional expression (1) is a conditional expression which is preferable for correcting favorably a spherical aberration which is susceptible to occur when the overall length of the optical system is shortened and an F-number is made small.

When a lower limit value of conditional expression (1) is not reached, the focal length of the first lens becomes short (the refractive power becomes large). Since a height of a marginal ray is high at the first lens, as the refractive power of the first lens becomes large, various aberrations, particularly, the spherical aberration occurs substantially. Moreover, since the refractive power of the overall image pickup optical system is centered on the first lens, sensitivity with respect to an error at the time of manufacturing of the first lens becomes high.

Here, it is preferable that the following conditional expression (1') is satisfied instead of conditional expression (1).

$$1.2 < f_1/f \quad (1')$$

Moreover, it is more preferable that the following conditional expression (1") is satisfied instead of conditional expression (1).

$$1.9 < f_1/f \quad (1'')$$

Moreover, in the image pickup optical system according to the present embodiment, it is preferable that the following conditional expression (2) is satisfied.

$$2.4 \text{ mm} < f_{12} < 9.2 \text{ mm} \quad (2)$$

where, f₁₂ denotes a combined focal length of the first lens and the second lens.

Conditional expression (2) is a conditional expression related to the combined focal length of the first lens and the second lens, and is preferable for letting the optical system have a wide angle of view.

When a lower limit value of conditional expression (2) is not reached, correction of a coma and correction of a curvature of field at a meridional plane become difficult. Whereas, when an upper limit value of conditional expression (2) is surpassed, it becomes difficult to position an entrance pupil on the object side. As a result, the angle of view of the optical system becomes small.

Here, it is more preferable that the following conditional expression (2') is satisfied instead of conditional expression (2).

$$3.7 \text{ mm} < f_{12} < 6.5 \text{ mm} \quad (2')$$

Moreover, it is even more preferable that the following conditional expression (2") is satisfied instead of conditional expression (2).

$$4.0 \text{ mm} < f_{12} < 5.5 \text{ mm} \quad (2'')$$

Moreover, in the image pickup optical system according to the present embodiment, it is preferable that the following conditional expression (3) is satisfied.

$$-0.9 < (r_{1o}+r_{1i})/(r_{1o}-r_{1i}) < -0.2 \quad (3)$$

where, $r_{1o}$ denotes a paraxial radius of curvature of an object-side surface of the first lens, and $r_{1i}$ denotes a paraxial radius of curvature of an image-side surface of the first lens.

Conditional expression (3) is a conditional expression related to a shape of a surface of the first lens.

When a lower limit value of conditional expression (3) is not reached, the paraxial radius of curvature of the object-side surface of the first lens becomes small. In such case, since an angle of a light ray which is incident on the object-side surface becomes large, correction of the coma becomes difficult.

Whereas, when an upper limit value of conditional expression (3) is surpassed, the paraxial radius of curvature of the object-side surface of the first lens becomes large, and the paraxial radius of curvature of the image-side surface of the first lens becomes small. In such case, it becomes difficult to position the principal point of the overall optical system on the object side. Therefore, it becomes difficult to shorten the overall length of the optical system.

Here, it is more preferable that the following conditional expression (3') is satisfied instead of conditional expression (3).

$$-0.6 < (r_{1o}+r_{1i})/(r_{1o}-r_{1i}) < -0.3 \quad (3')$$

Moreover, it is even more preferable that the following conditional expression (3") is satisfied instead of conditional expression (3).

$$-0.5 < (r_{1o}+r_{1i})/(r_{1o}-r_{1i}) < -0.35 \quad (3'')$$

Moreover, in the image pickup optical system according to the present embodiment, it is preferable that the following conditional expression (4) is satisfied.

$$0.5 < (r_{2o}+r_{2i})/(r_{2o}-r_{2i}) < 1.7 \quad (4)$$

where, $r_{2o}$ denotes a paraxial radius of curvature of an object-side surface of the second lens, and $r_{2i}$ denotes a paraxial radius of curvature of an image-side surface of the second lens.

Conditional expression (4) is a conditional expression related to a shape of a surface of the second lens.

When a lower limit value of conditional expression (4) is not reached, the paraxial radius of curvature of the image-side surface of the second lens becomes large. In such case, since it is not possible to make large an angle of alight ray which emerges from the second lens, shortening of the overall length of the optical system becomes difficult. Whereas, when an upper limit value of conditional expression (4) is surpassed, since the paraxial radius of curvature of the object-side surface of the second lens becomes large, correction of a longitudinal chromatic aberration becomes difficult.

Here, it is more preferable that the following conditional expression (4') is satisfied instead of conditional expression (4).

$$0.8 < (r_{2o} + r_{2i})/(r_{2o} - r_{2i}) < 1.1 \quad (4')$$

Moreover, it is even more preferable that the following conditional expression (4") is satisfied instead of conditional expression (4).

$$0.85 < (r_{2o} + r_{2i})/(r_{2o} - r_{2i}) < 1.0 \quad (4")$$

Moreover, in the image pickup optical system according to the present embodiment, it is preferable that the following conditional expression (5) is satisfied.

$$2.0 < r_{3o}/r_{3i} < 8.0 \quad (5)$$

where, $r_{3o}$ denotes a paraxial radius of curvature of an object-side surface of the third lens, and $r_{3i}$ denotes a paraxial radius of curvature of an image-side surface of the third lens.

Conditional expression (5) is a conditional expression in which, a ratio of the paraxial radius of curvature of the object-side surface of the third lens and the paraxial radius of curvature of the image-side surface of the third lens is taken, and which regulates distribution of a refractive power of the object-side surface and a refractive power of the image-side surface. Conditional expression (5) is a conditional expression which is preferable for correcting the curvature of field favorably, while shortening the overall length of the optical system.

When a lower limit value of conditional expression (5) is not reached, the paraxial radius of curvature of the object-side surface of the third lens becomes excessively small (the refractive power becomes excessively large). Therefore correction of the curvature of field becomes difficult. Whereas, when an upper limit value of conditional expression (5) is surpassed, the paraxial radius of curvature of the object side surface of the third lens becomes excessively large (the refractive power becomes excessively small). Therefore, shortening of the overall length of the optical system becomes difficult.

Here, it is more preferable that the following conditional expression (5') is satisfied instead of conditional expression (5).

$$2.5 < r_{3o}/r_{3i} < 6.0 \quad (5')$$

Moreover, it is even more preferable that the following conditional expression (5") is satisfied.

$$3.0 < r_{3o}/r_{3i} < 5.0 \quad (5")$$

Moreover, in the image pickup optical system according to the present embodiment, it is preferable that each of the first lens, the second lens, the third lens, and the fourth lens is formed of a resin. By making such an arrangement, it is possible to provide the image pickup optical system at a low cost.

Moreover, an image pickup apparatus according to a second aspect of the present invention includes the image pickup optical system described above, and an image pickup element. It is possible to provide an image pickup apparatus with a wide angle of view in which, the overall length of the optical system is maintained to be short, and various aberrations, particularly the coma, are corrected favorably. Moreover, it is possible to provide an image pickup apparatus in which, the spherical aberration is corrected favorably, while being an optical system with a comparatively small F-number.

Moreover, in the image pickup apparatus according to the present embodiment, it is preferable that the image pickup optical system and the image pickup element are integrated. By integrating the image pickup optical system and the image pickup element, it is possible to convert an optical image captured by the image pickup optical system, to an electric signal. Moreover, by selecting an electronic image pickup element which is capable of reducing a change in brightness at a central portion of an image and at a peripheral portion of the image, it is possible to provide an image pickup apparatus having a small size and improved performance.

Moreover, in the image pickup apparatus according to the present embodiment, it is preferable that the image pickup optical system is integrated with an auto-focus mechanism. By integrating the auto-focus mechanism, it is possible to focus at any object-distance.

Examples of an image pickup optical system and an image pickup apparatus will be described below in detail by referring to the accompanying diagrams. However, the present invention is not restricted to the examples described below. Moreover, as to whether the refractive power is positive or negative is based on the paraxial radius of curvature. Moreover, the aperture stop is positioned nearest to the object side. Here, the aperture stop is positioned on the object side of the image-side surface of the first lens, or more concretely, the aperture stop is positioned between the object-side surface of the first lens and the image-side surface of the first lens. Such a position of the aperture stop is also to be included in 'the aperture stop is positioned nearest to the object side'.

An image pickup optical system according to a first example will be described below. FIG. 1 is a cross-sectional view along an optical axis showing an optical arrangement at the time of infinite object point focusing of the image pickup optical system according to the first example.

FIG. 2A to FIG. 2D are aberration diagrams at the time of infinite object point focusing of the image pickup optical system according to the first example, and 'FIY' denotes an image height. Symbols in the aberration diagrams are common for all the examples which will be described later.

Moreover, in the aberration diagrams, FIG. 2A, FIG. 2B, FIG. 2C, and FIG. 2D show spherical aberration (SA), astigmatism (AS), distortion (DT), and chromatic aberration of magnification (CC) respectively.

The image pickup optical system according to the first example, as shown in FIG. 1, includes in order from an object side, an aperture stop S, a first lens L1 having a positive refractive power, a second lens L2 having a negative refractive power, a third lens L3 having a positive refractive power, and a fourth lens L4 having a positive refractive power. In all the examples to be described below, in lens cross-sectional views, CG denotes a cover glass, and I denotes an image pickup surface of an image pickup element.

The first lens L1 is a biconvex positive lens. The second lens L2 is a biconcave negative lens. The third lens L3 is a positive meniscus lens having a convex surface directed toward an image side. The fourth lens L4 is a negative meniscus lens having a convex surface directed toward the object side.

The first lens L1 has a biconvex shape. Moreover, a lens surface on the image side of the second lens L2 has a shape such that, a concave surface is directed toward the image side. Moreover, a lens surface on the image side of the third lens L3 has a shape such that, a convex surface is directed toward the image side. Each of the first lens L1, the second lens L2, the third lens L3, and the fourth lens L4 (hereinafter, 'the lenses from the first lens L1 to the fourth lens L4') is formed of a resin.

An aspheric surface is provided to both surfaces of each of the lenses from the first lens L1 to the fourth lens L4.

Figure 3:
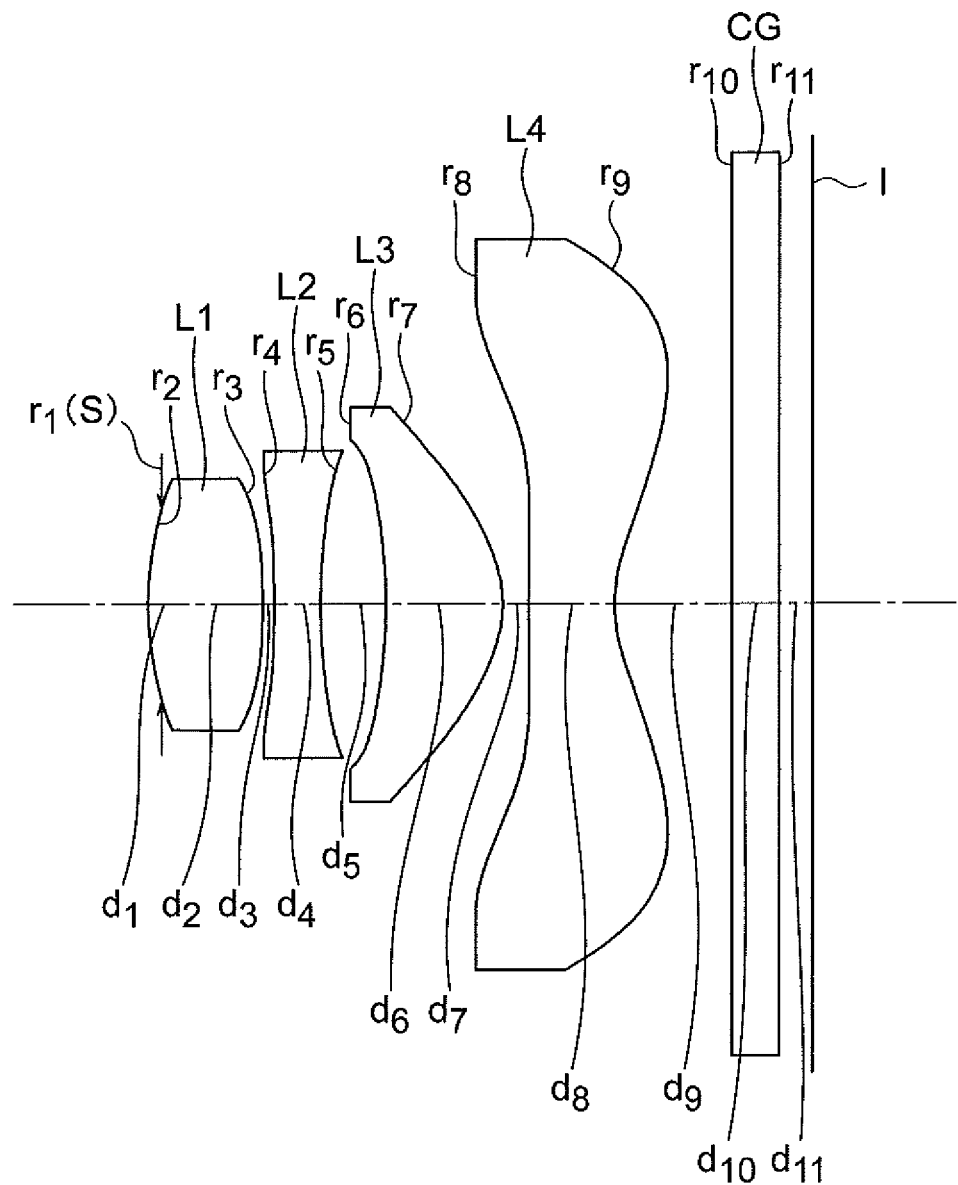
FIG. 3 is a cross-sectional view along an optical axis showing an optical arrangement at the time of infinite object point focusing of an image pickup optical system according to a second example of the present invention.
Figure 4:
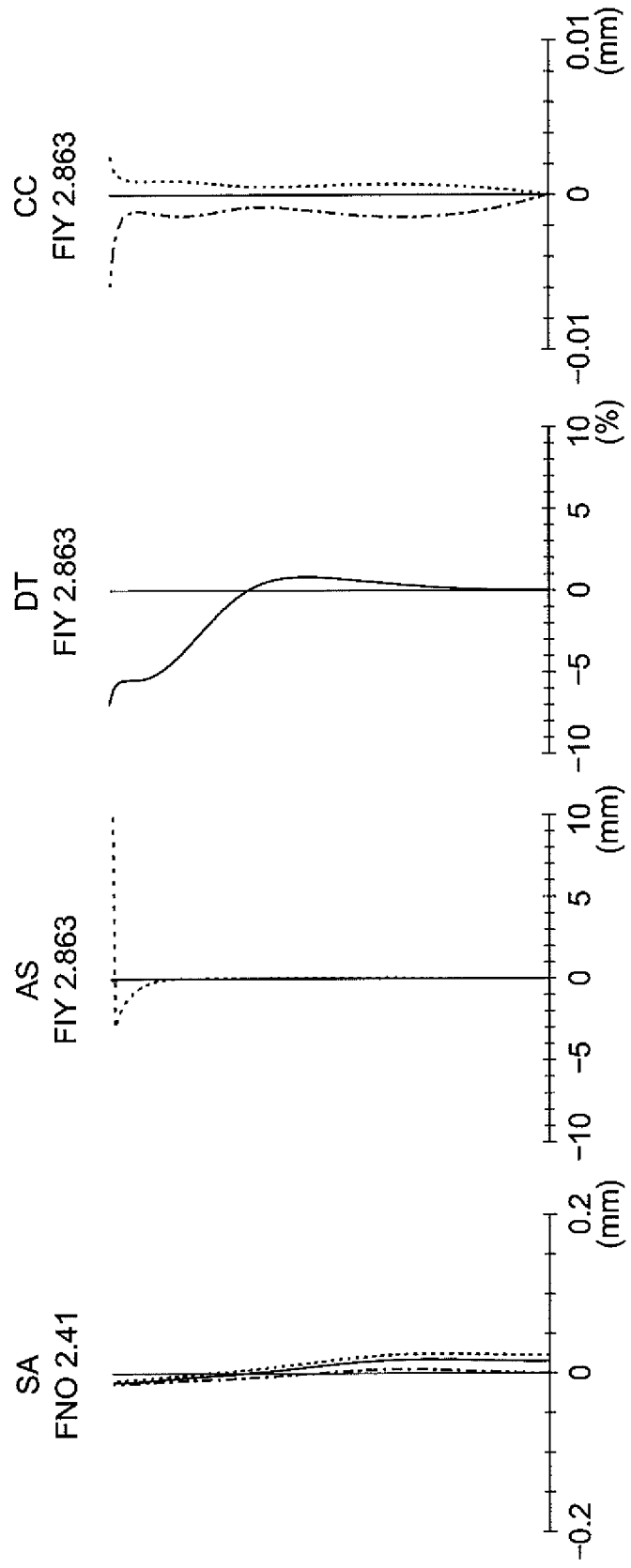
FIG. 4A, FIG. 4B, FIG. 4C, and FIG. 4D (hereinafter, 'FIG. 4A to FIG. 4D') are diagrams showing spherical aberration (SA), astigmatism (AS), distortion (DT), and chromatic aberration of magnification (CC) at the time of infinite object point focusing of the image pickup optical system according to the second example.

Next, an image pickup optical system according to a second example will be described below. FIG. 3 is a cross-sectional view along an optical axis showing an optical arrangement at the time of infinite object point focusing of the image pickup optical system according to the second example. Moreover, FIG. 4A to FIG. 4D are aberration diagrams at the time of infinite object point focusing of the image pickup optical system according to the second example.

The image pickup optical system according to the second example, as shown in FIG. 3, includes in order from an object side, an aperture stop S, a first lens L1 having a positive refractive power, a second lens L2 having a negative refractive power, a third lens L3 having a positive refractive power, and a fourth lens L4 having a positive refractive power.

The first lens L1 is a biconvex positive lens. The second lens L2 is a biconcave negative lens. The third lens L3 is a positive meniscus lens having a convex surface directed toward an image side. The fourth lens L4 is a negative meniscus lens having a convex surface directed toward the object side.

The first lens L1 has a biconvex shape. Moreover, a lens surface on the image side of the second lens L2 has a shape such that, a concave surface is directed toward the image side. Moreover, a lens surface on the image side of the third lens L3 has a shape such that, a convex surface is directed toward the image side. Each of the lenses from the first lens L1 to the fourth lens L4 is formed of a resin.

An aspheric surface is provided to both surfaces of each of the lenses from the first lens L1 to the fourth lens L4.

Figure 5:
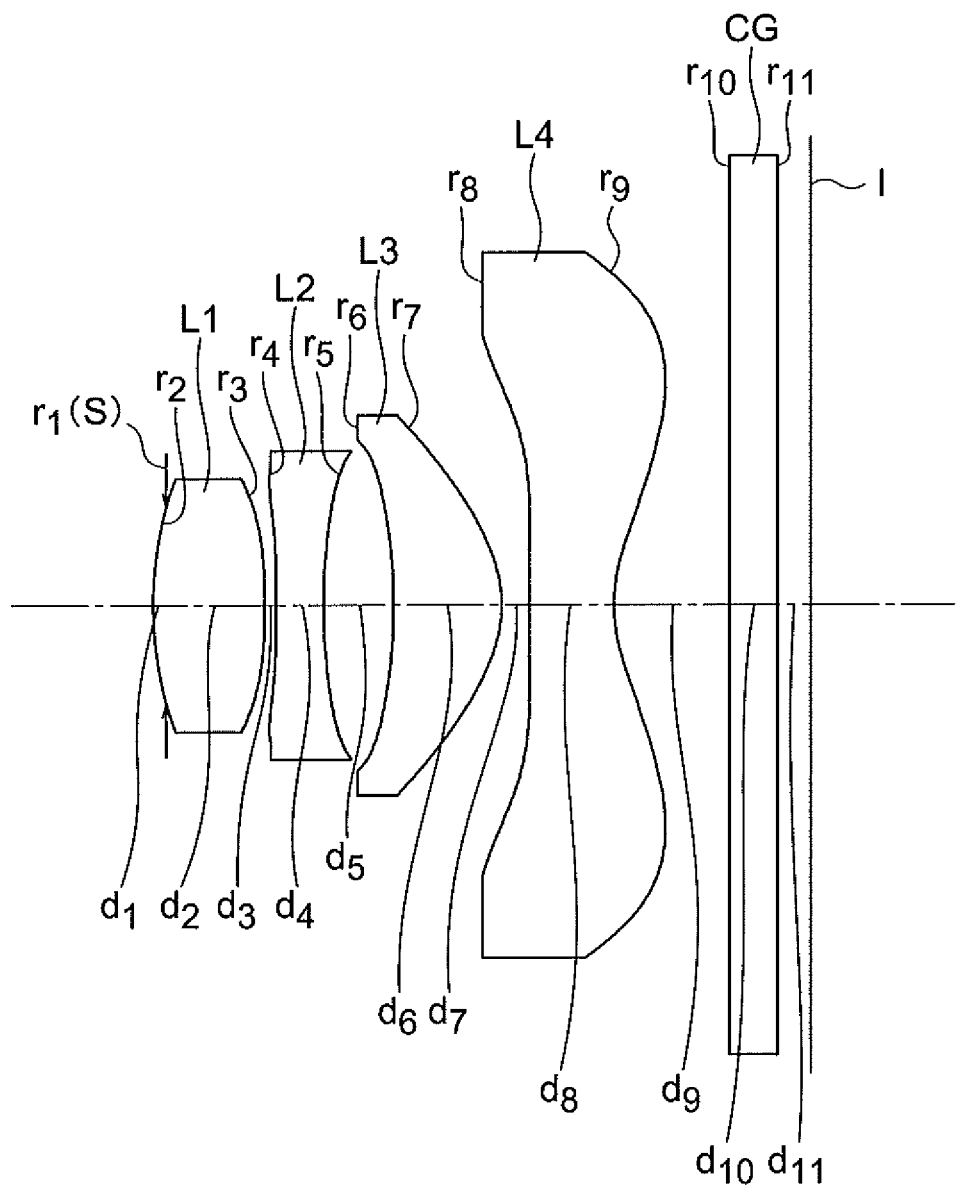
FIG. 5 is a cross-sectional view along an optical axis showing an optical arrangement at the time of infinite object point focusing of an image pickup optical system according to a third example of the present invention.
Figure 6:
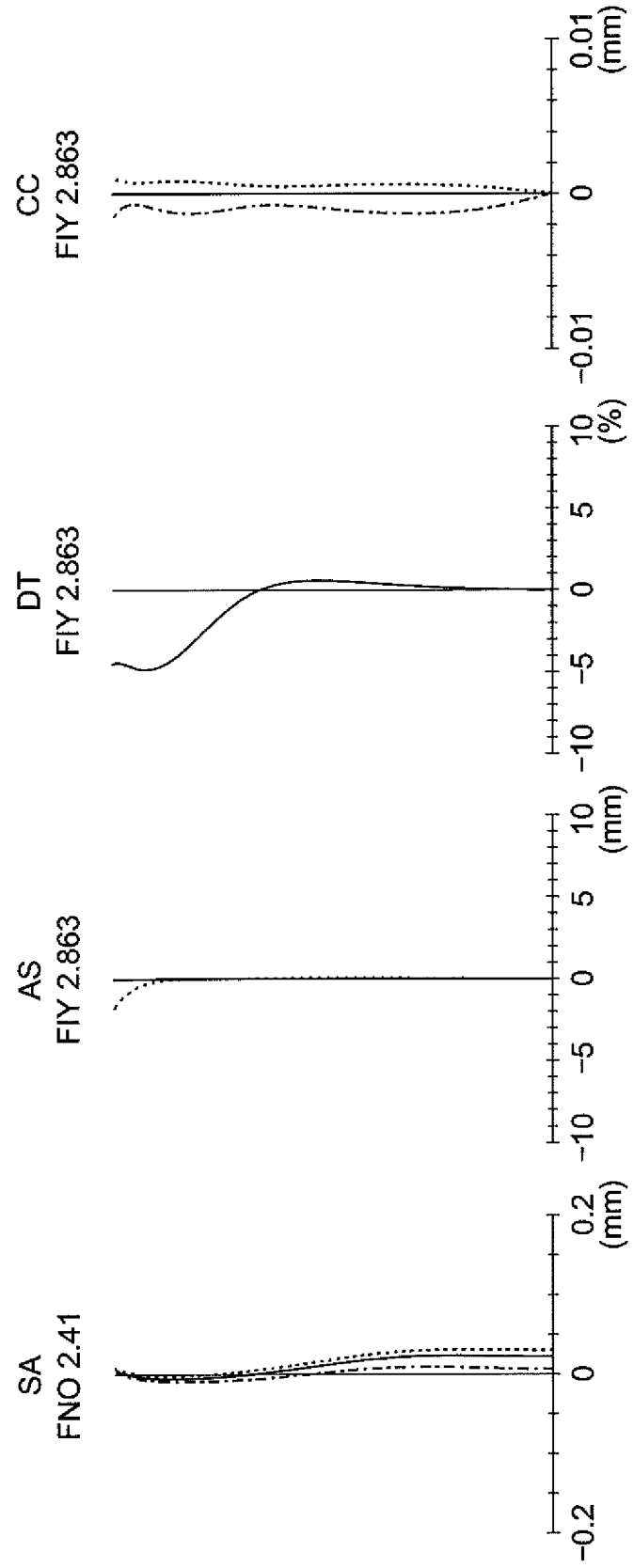
FIG. 6A, FIG. 6B, FIG. 6C, and FIG. 6D (hereinafter, 'FIG. 6A to FIG. 6D') are diagrams showing spherical aberration (SA), astigmatism (AS), distortion (DT), and chromatic aberration of magnification (CC) at the time of infinite object point focusing of the image pickup optical system according to the third example.

Next, an image pickup optical system according to a third example will be described below. FIG. 5 is a cross-sectional view along an optical axis showing an optical arrangement at the time of infinite object point focusing of the image pickup optical system according to the third example. Moreover, FIG. 6A to FIG. 6D are aberration diagrams at the time of infinite object point focusing of the image pickup optical system according to the third example.

The image pickup optical system according to the third example, as shown in FIG. 5, includes in order from an object side, an aperture stop S, a first lens L1 having a positive refractive power, a second lens L2 having a negative refractive power, a third lens L3 having a positive refractive power, and a fourth lens L4 having a positive refractive power.

The first lens L1 is a biconvex positive lens. The second lens L2 is a negative meniscus lens having a convex surface directed toward the object side. The third lens L3 is a positive meniscus lens having a convex surface directed toward an image side. The fourth lens L4 is a negative meniscus lens having a convex surface directed toward the object side.

The first lens L1 has a biconvex shape. Moreover, a lens surface on the image side of the second lens L2 has a shape such that, a concave surface is directed toward the image side. Moreover, a lens surface on the image side of the third lens L3 has a shape such that, a convex surface is directed toward the image side. Each of the lenses from the first lens L1 to the fourth lens L4 is formed of a resin.

An aspheric surface is provided to both surfaces of each of the lenses from the first lens L1 to the fourth lens L4.

Next, numerical data of optical components comprising the image pickup optical system of each above example are shown. In numerical data of each example, r1, r2, . . . stands for a curvature radius of each lens surface, d1, d2, . . . stands for a thickness of each lens or an air distance between adjacent lens surfaces, nd1, nd2, . . . stands for a refractive index of each lens for d-line, ν1, νd2, . . . stands for an Abbe number of each lens, * stands for an aspheric surface, focal length stands for a focal length of a total optical system, fb stands for a back focus. The total length is the distance from the frontmost lens surface to the rearmost lens surface plus back focus. Further, fb (back focus) is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, e stands for exponent of ten. These symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1(stop) | ∞ | −0.09 | | |
| 2* | 2.010 | 0.73 | 1.53048 | 55.71 |
| 3* | −5.281 | 0.07 | | |
| 4* | −65.243 | 0.29 | 1.63415 | 23.96 |
| 5* | 3.951 | 0.41 | | |
| 6* | −3.315 | 0.73 | 1.53048 | 55.71 |
| 7* | −0.785 | 0.15 | | |
| 8* | 77.011 | 0.56 | 1.53048 | 55.71 |
| 9* | 0.911 | 0.69 | | |
| 10 | ∞ | 0.30 | 1.51633 | 64.14 |
| 11 | ∞ | 0.20 | | |
| Image plane | ∞ | | | |

| Aspherical surface data |
|---|

2nd surface k = −0.535
A4 = −4.96626e−02, A6 = 1.18041e−01, A8 = −7.02397e−01
A10 = 1.52056e+00, A12 = −1.47391e+00

3rd surface k = −14.994
A4 = −3.78236e−01, A6 = 4.01220e−01, A8 = 1.48936e−01,
A10 = −7.71833e−01, A12 = 3.81019e−01

4th surface k = 600.009
A4 = −3.65299e−01, A6 = 3.18357e−01, A8 = 4.59328e−01,
A10 = −8.32873e−01, A12 = 3.81838e−01

-continued

Unit mm

5th surface k = −7.367
A4 = −2.52226e−03, A6 = −1.23429e−01, A8 = 3.40938e−01,
A10 = −3.39698e−01, A12 = 1.46071e−01

6th surface k = −3.374
A4 = 1.56848e−02, A6 = 8.59184e−02, A8 = −2.82576e−01,
A10 = 2.61161e−01, A12 = −1.32553e−01

7th surface k = −3.080
A4 = −1.35188e−01, A6 = 2.00467e−01, A8 = −2.56587e−01,
A10 = 1.63897e−01, A12 = −3.78814e−02

8th surface k = −484.059
A4 = −1.65248e−02, A6 = −7.64057e−02, A8 = 4.52041e−02,
A10 = −9.59837e−03, A12 = 7.38350e−04, A14 = 1.68384e−06

9th surface k = −5.612
A4 = −6.25306e−02, A6 = 1.72608e−02, A8 = −4.60407e−03,
A10 = 5.41991e−04, A12 = −3.96526e−05, A14 = 2.26417e−06

| Half angel of view | 77.4 |
| Focal length | 2.98 |
| fb (in air) | 1.09 |
| Lens total length (in air) | 4.03 |

Example 2

Unit mm

Surface data

| Surface no. | r | d | nd | vd |
| --- | --- | --- | --- | --- |
| Object plane | ∞ | ∞ | | |
| 1(stop) | ∞ | −0.08 | | |
| 2* | 2.060 | 0.72 | 1.53048 | 55.71 |
| 3* | −5.059 | 0.07 | | |
| 4* | −81.306 | 0.29 | 1.63415 | 23.96 |
| 5* | 3.733 | 0.41 | | |
| 6* | −3.376 | 0.73 | 1.53048 | 55.71 |
| 7* | −0.792 | 0.16 | | |
| 8* | 22.199 | 0.54 | 1.53048 | 55.71 |
| 9* | 0.922 | 0.73 | | |
| 10 | ∞ | 0.30 | 1.51633 | 64.14 |
| 11 | ∞ | 0.20 | | |
| Image plane | ∞ | | | |

Aspherical surface data

2nd surface k = −0.502
A4 = −4.92101e−02, A6 = 1.04726e−01, A8 = −7.28218e−01,
A10 = 1.51279e+00, A12 = −1.41668e+00

3rd surface k = −6.822
A4 = −3.83845e−01, A6 = 4.03800e−01, A8 = 1.23798e−01,
A10 = −8.19376e−01, A12 = 3.99327e−01

4th surface k = 600.283
A4 = −3.66039e−01, A6 = 3.08151e−01, A8 = 4.65487e−01,
A10 = −8.25242e−01, A12 = 3.51559e−01

5th surface k = −8.086
A4 = −1.01925e−03, A6 = −1.09544e−01, A8 = 3.47752e−01,
A10 = −3.43013e−01, A12 = 1.41171e−01

-continued

Unit mm

6th surface k = −2.479
A4 = 1.38070e−02, A6 = 8.36183e−02, A8 = −2.77508e−01,
A10 = 2.69411e−01, A12 = −1.27419e−01

7th surface k = −3.164
A4 = −1.47836e−01, A6 = 2.01287e−01, A8 = −2.55000e−01,
A10 = 1.64134e−01, A12 = −3.80057e−02

8th surface k = −95.838
A4 = −1.63747e−02, A6 = −7.64721e−02, A8 = 4.51689e−02,
A10 = −9.60983e−03, A12 = 7.35634e−04, A14 = 9.73765e−07

9th surface k = −5.412
A4 = −6.12020e−02, A6 = 1.71576e−02, A8 = −4.66505e−03,
A10 = 5.34481e−04, A12 = −3.95340e−05, A14 = 2.56067e−06

| Half angel of view | 77.4 |
| Focal length | 2.98 |
| fb (in air) | 1.13 |
| Lens total length (in air) | 4.04 |

Example 3

Unit mm

Surface data

| Surface no. | r | d | nd | vd |
| --- | --- | --- | --- | --- |
| Object plane | ∞ | ∞ | | |
| 1(stop) | ∞ | −0.08 | | |
| 2* | 2.047 | 0.69 | 1.53048 | 55.71 |
| 3* | −5.055 | 0.07 | | |
| 4* | 276.963 | 0.29 | 1.63415 | 23.96 |
| 5* | 3.548 | 0.43 | | |
| 6* | −3.202 | 0.67 | 1.53048 | 55.71 |
| 7* | −0.780 | 0.17 | | |
| 8* | 22.445 | 0.52 | 1.53048 | 55.71 |
| 9* | 0.895 | 0.71 | | |
| 10 | ∞ | 0.30 | 1.51633 | 64.14 |
| 11 | ∞ | 0.20 | | |
| Image plane | ∞ | | | |

Aspherical surface data

2nd surface k = −0.588
A4 = −5.04076e−02, A6 = 9.75853e−02, A8 = −7.39906e−01,
A10 = 1.47729e+00, A12 = −1.37301e+00

3rd surface k = −2.368
A4 = −3.87571e−01, A6 = 4.02763e−01, A8 = 1.16895e−01,
A10 = −8.18779e−01, A12 = 5.54961e−01

4th surface k = −600.013
A4 = −3.63604e−01, A6 = 3.11746e−01, A8 = 4.88576e−01,
A10 = −7.81590e−01, A12 = 3.78510e−01

5th surface k = −8.695
A4 = −3.52627e−04, A6 = −1.00398e−01, A8 = 3.60016e−01,
A10 = −3.32795e−01, A12 = 1.42762e−01

6th surface k = −2.634
A4 = 1.41051e−02, A6 = 8.27404e−02, A8 = −2.77046e−01,
A10 = 2.70587e−01, A12 = −1.26407e−01

-continued

Unit mm

7th surface k = −3.247
A4 = −1.48572e−01, A6 = 2.03044e−01, A8 = −2.53803e−01,
A10 = 1.63841e−01, A12 = −3.88678e−02

8th surface k = −268.707
A4 = −1.91158e−02, A6 = −7.65146e−02, A8 = 4.53976e−02,
A10 = −9.54247e−03, A12 = 7.42199e−04, A14 = −5.01033e−06

9th surface k = −5.539
A4 = −6.35676e−02, A6 = 1.70837e−02, A8 = −4.67532e−03,
A10 = 5.35311e−04, A12 = −4.04026e−05, A14 = 3.35478e−06

| | |
|---|---|
| Half angel of view | 77.4 |
| Focal length | 2.99 |
| fb (in air) | 1.13 |
| Lens total length (in air) | 3.98 |

Next, the values of conditional expressions (1) to (5) in each example are shown below.

| Conditional expressions | Example1 | Example2 | Example3 |
|---|---|---|---|
| (1) $f_1/f$ | 0.95 | 0.96 | 0.95 |
| (2) $f_{12}$ | 4.61 | 4.80 | 4.72 |
| (3) $(r_{1o} + r_{1i})/(r_{1o} - r_{1i})$ | −0.45 | −0.42 | −0.42 |
| (4) $(r_{2o} + r_{2i})/(r_{2o} - r_{2i})$ | 0.89 | 0.91 | 1.03 |
| (5) $r_{3o}/r_{3i}$ | 4.22 | 4.26 | 4.11 |

It is possible to use such an imaging (image pickup) optical system of the present invention described above in an image pickup apparatus in which an image of an object is photographed by an electric image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 7:
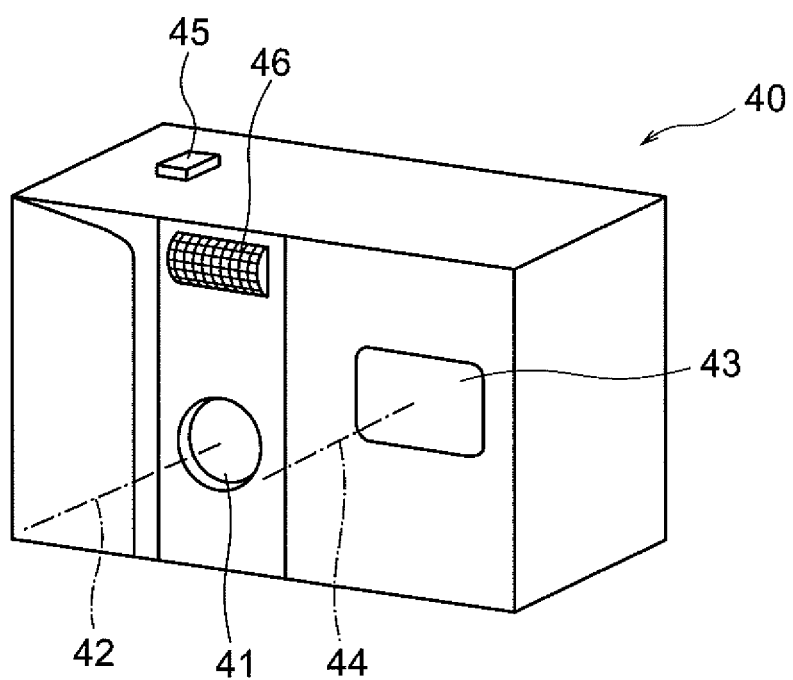
FIG. 7 is a front perspective view showing an appearance of a digital camera 40 in which, the optical system according to the present invention has been incorporated.
Figure 8:
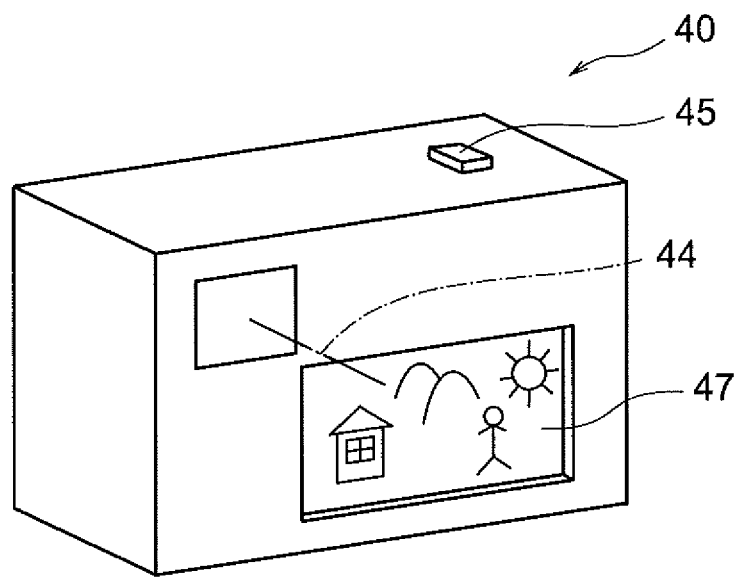
FIG. 8 is a rear perspective view of the digital camera 40.
Figure 9:
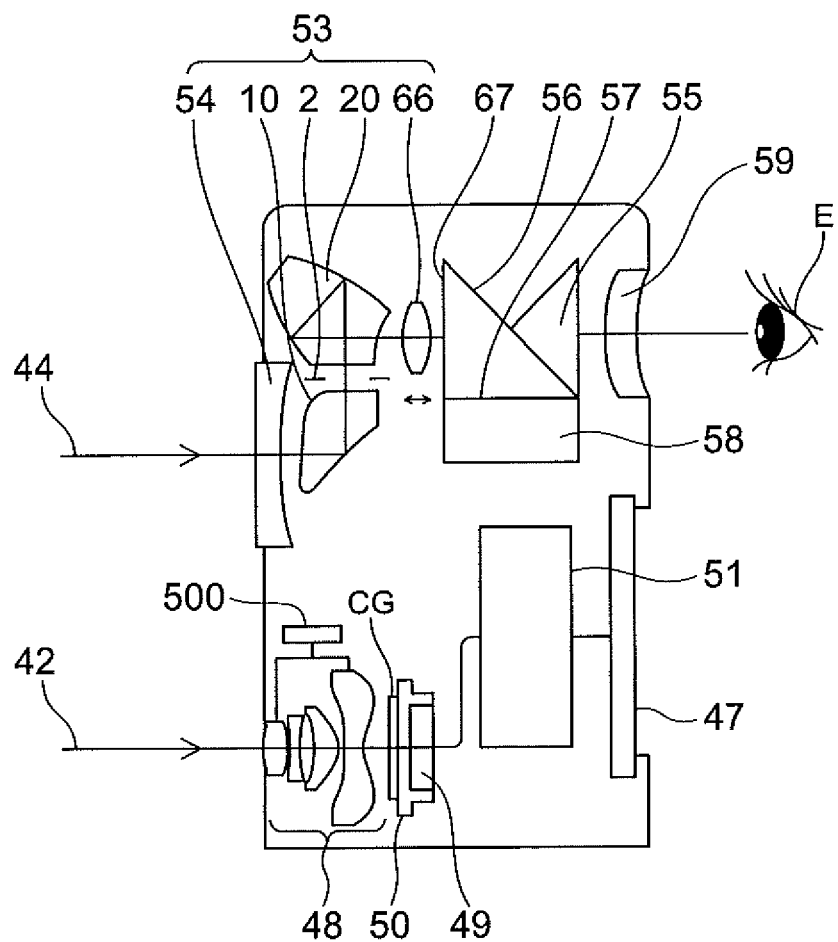
FIG. 9 is a cross-sectional view showing an optical arrangement in the digital camera 40.

In FIG. 7 to FIG. 9 show conceptual diagrams of structures in which the imaging optical system according to the present invention is incorporated in a photographic optical system 41 of a digital camera. FIG. 7 is a frontward perspective view showing an appearance of a digital camera 40, FIG. 8 is a rearward perspective view of the same, and FIG. 9 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter button 45, a flash 46, and a liquid-crystal display monitor 47. Moreover, when the shutter button 45 disposed at an upper portion of the camera 40 is pressed by a photographer, in conjugation with this, a photograph is taken through the photographic optical system 41 such as the image pickup optical system 48 in the first example.

An object image formed by the photographic optical system 41 is formed on an image pickup surface of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame 57 of a Porro prism 55 which is an image erecting member. On a rear side of this Porro prism 55, an eyepiece optical system 59 which guides an image formed as an erected normal image to a viewer's eyeball E is disposed.

By the digital camera 40 structured in such manner, it is possible to realize an optical image pickup apparatus having a image pickup optical system with a reduced size and thickness, in which the number of structural components is reduced. Further, the present invention could be applied not only the above-mentioned collapsible type digital camera but also a bending type digital camera having a bending optical system.

The digital camera includes an auto-focus mechanism 500 which is integrated with an image pickup optical system. By installing the auto-focus mechanism 500, it is possible to focus at any object distance.

Moreover, it is desirable that the image pickup optical system 41 and an electronic image pickup element chip (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a digital camera (an image pickup apparatus) having a small size and an improved performance.

Figure 10:
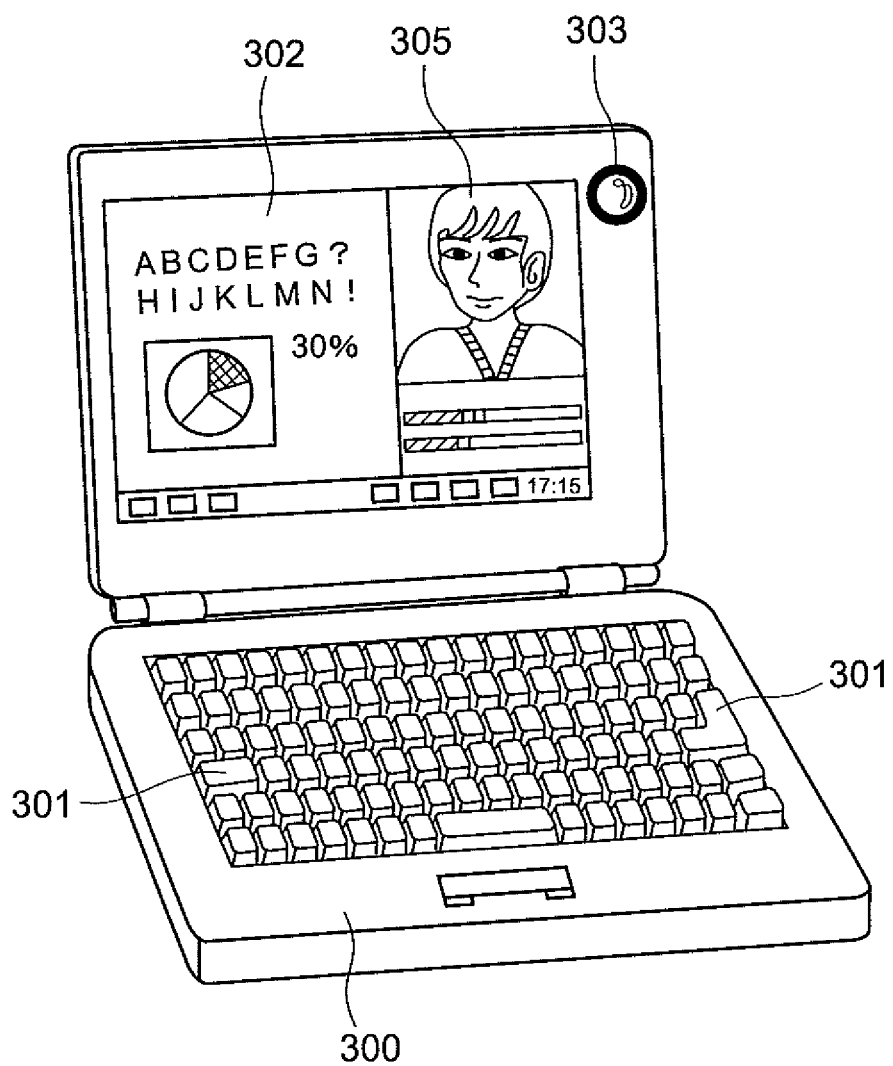
FIG. 10 is a front perspective view of a state in which, a cover of a personal computer 300 which is an example of an information processing apparatus in which, the optical system according to the present invention has been built-in as an objective optical system, is open.
Figure 11:
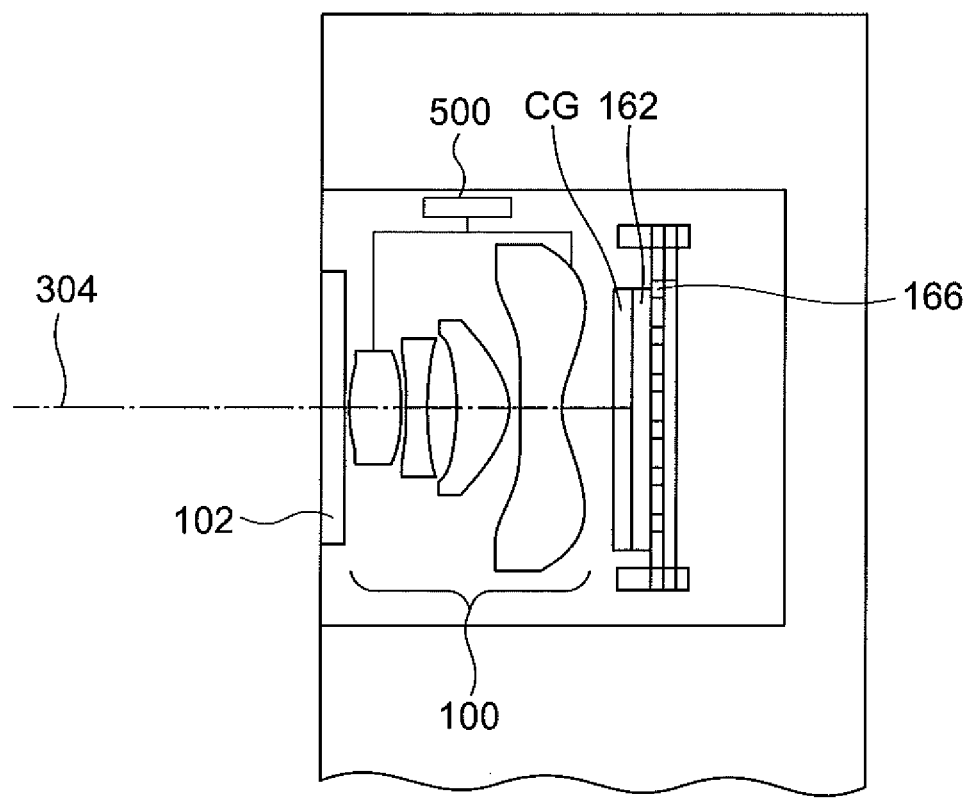
FIG. 11 is a cross-sectional view of a photographic optical system 303 of the personal computer 300.
Figure 12:
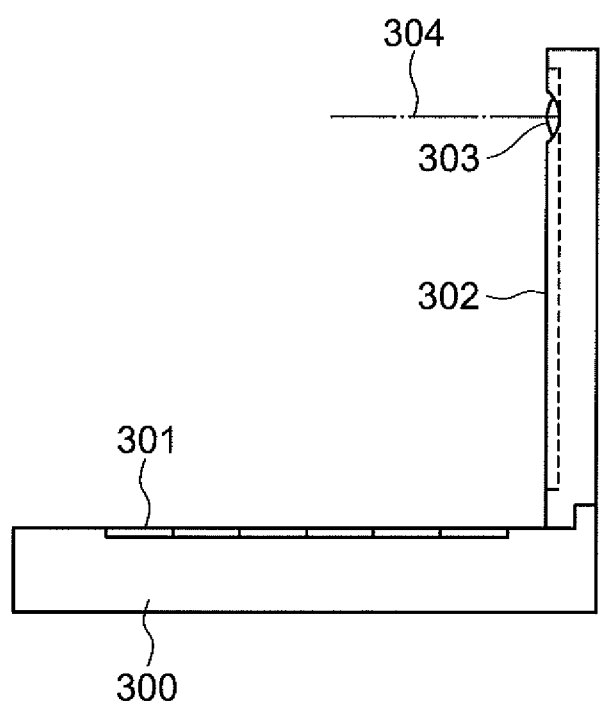
FIG. 12 is a side view of the personal computer 300.

Next, a personal computer which is an example of an information processing apparatus with a built-in image forming system as an objective optical system is shown in FIG. 10 to FIG. 12. FIG. 10 is a frontward perspective view of a personal computer 300 with its cover opened, FIG. 11 is a cross-sectional view of a photographic optical system 303 of the personal computer 300, and FIG. 12 is a side view of FIG. 10. As it is shown in FIG. 10 to FIG. 12, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the image pickup optical system in the first example for instance, and an electronic image pickup element chip 162 which receives an image. These are built into the personal computer 300.

At a front end of a mirror frame, a cover glass 102 for protecting the objective optical system 100 is disposed. At a front surface side of the electronic image pickup element chip 162, a cover glass CG is disposed.

An object image received at the electronic image pickup element chip 162 is input to a processing means of the personal computer 300 via a terminal 166. Further, the object image is displayed as an electronic image on the monitor 302. In FIG. 10, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The personal computer 300 includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a personal computer (an image pickup apparatus) having a small size and an improved performance.

Figure 13A:
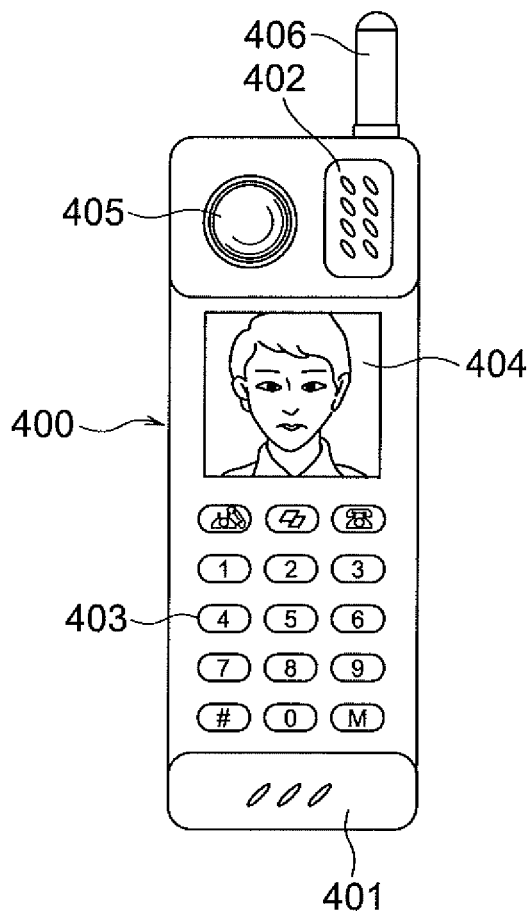
FIG. 13A, FIG. 13B, and FIG. 13C are diagrams showing a portable telephone which is an example of the information processing apparatus in which, the optical system according to the present invention has been built-in as a photographic optical system, where.
Figure 13B:
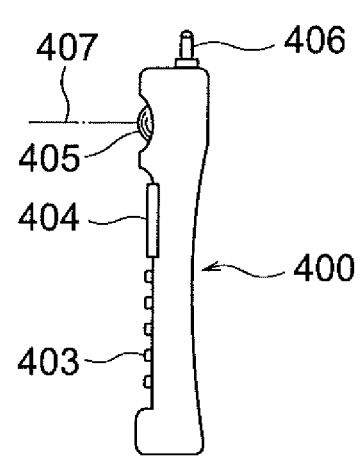
Figure 13C:
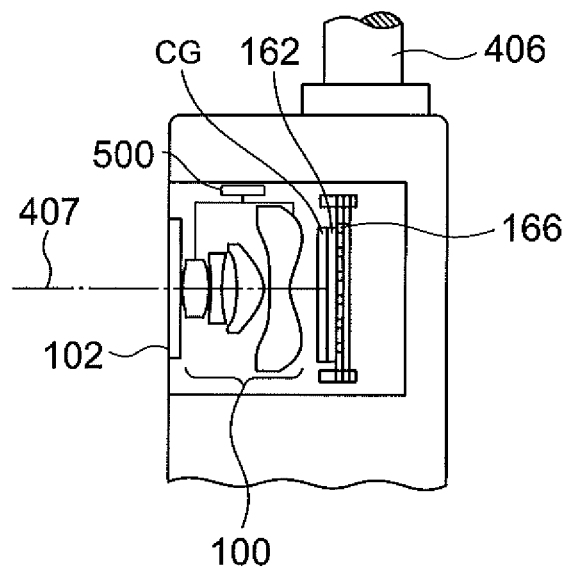

Next, a telephone which is an example of an information processing apparatus in which the image forming optical system of the present invention is built-in as a photographic optical system, particularly a portable telephone which is easy to carry is shown in FIG. 13A, FIG. 13B, and FIG. 13C. FIG. 13A is a front view of a portable telephone 400, FIG. 13B is a side view of the portable telephone 400, and FIG. 13C is a cross-sectional view of a photographic optical system 405. As shown in FIG. 13A to FIG. 13C, the portable telephone 400 includes a microphone section 401, a speaker section 402, an input button 403, a monitor 404, the photographic optical system 405, an antenna 406, and a processing means.

Here, the microphone section 401 is for inputting a voice of the operator as information. The speaker section 402 is for outputting a voice of the communication counterpart. The input button 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first example for instance, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The telephone 400 includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a telephone (an image pickup apparatus) having a small size and an improved performance.

The present invention can have various modified embodiments without departing from the scope of the invention.

As it has been described above, the present invention is suitable for an image pickup optical system with a wide angle of view in which, the overall length of the optical system is maintained to be short, and various aberrations, particularly the coma, are corrected favorably, and for an image pickup apparatus in which such image pickup optical system is used. Moreover, the present invention is suitable for an image pickup optical system in which, the spherical aberration is corrected favorably, while being an optical system with a comparatively small F-number, and for an image pickup apparatus in which such image pickup optical system is used.

What is claimed is:

1. An image pickup optical system comprising in order from an object side:
   a first lens having a positive refractive power;
   a second lens having a negative refractive power;
   a third lens having a positive refractive power; and
   a fourth lens having a negative refractive power,
wherein:
   the first lens has a biconvex shape,
   the second lens has a biconcave shape, an object-side surface which is a concave surface directed toward an object side in the vicinity of an optical axis, and an image-side surface which is a concave surface directed toward an image side,
   at least an image-side surface of the third lens has a shape such that, a convex surface is directed toward the image side,
   an aperture stop is disposed nearer to the object side than the first lens is, and
   the following conditional expression (1) is satisfied:

$$0.9 < f_1/f \tag{1}$$

where $f_1$ denotes a focal length of the first lens, and f denotes a focal length of the overall image pickup optical system.

2. The image pickup optical system according to claim 1, wherein the following conditional expression (2) is satisfied:

$$2.4 \text{ mm} < f_{12} < 9.2 \text{ mm} \tag{2}$$

where, $f_{12}$ denotes a combined focal length of the first lens and the second lens.

3. The image pickup optical system according to claim 1, wherein the following conditional expression (3) is satisfied:

$$-0.9 < (r_{1o} + r_{1i})/(r_{1o} - r_{1i}) < -0.2 \tag{3}$$

where, $r_{1o}$ denotes a paraxial radius of curvature of an object-side surface of the first lens, and $r_{1i}$ denotes a paraxial radius of curvature of an image-side surface of the first lens.

4. The image pickup optical system according to claim 1, wherein the following conditional expression (4") is satisfied:

$$0.5 < (r_{2o} + r_{2i})/(r_{2o} - r_{2i}) < 1.0 \tag{4"}$$

where, $r_{2o}$ denotes a paraxial radius of curvature of an object-side surface of the second lens, and $r_{2i}$ denotes a paraxial radius of curvature of an image-side surface of the second lens.

5. The image pickup optical system according to claim 1, wherein the following conditional expression (5) is satisfied:

$$2.0 < r_{3o}/r_{3i} < 8.0 \tag{5}$$

where, $r_{3o}$ denotes a paraxial radius of curvature of an object-side surface of the third lens, and $r_{3i}$ denotes a paraxial radius of curvature of an image-side surface of the third lens.

6. The image pickup optical system according to claim 1, wherein each of the first lens, the second lens, the third lens, and the fourth lens is formed of a resin.

7. An image pickup apparatus comprising:
an image pickup optical system according to claim 1; and
an image pickup element.

8. The image pickup apparatus according to claim 7, wherein the image pickup optical system and the image pickup element are integrated.

9. The image pickup apparatus according to claim 7, wherein the image pickup optical system is integrated with an auto-focus mechanism.

* * * * *

UNITED STATES PATENT AND TRADEMARK OFFICE
CERTIFICATE OF CORRECTION

PATENT NO. : 8,988,794 B2
APPLICATION NO. : 13/789958
DATED : March 24, 2015
INVENTOR(S) : Ryu Ota It is certified that error appears in the above-identified patent and that said Letters Patent is hereby corrected as shown below:

In the Specification:

at column 8, line 26, change "A10," to "A10, …";
at column 8, line 27, change "/" to "]";
at column 8, line 28, change "$A10y^{10}$" to "$A10y^{10} + …$";
at column 9, line 25, change "angel" to "angle";
at column 10, line 21, change "angel" to "angle"; and
at column 11, line 17, change "angel" to "angle".

Signed and Sealed this
Twenty-ninth Day of September, 2015

Michelle K. Lee
*Director of the United States Patent and Trademark Office*